US009516418B2

(12) United States Patent
Paranjpe et al.

(10) Patent No.: US 9,516,418 B2
(45) Date of Patent: Dec. 6, 2016

(54) SOUND FIELD SPATIAL STABILIZER

(71) Applicant: QNX Software Systems Limited, Kanata (CA)

(72) Inventors: Shreyas Paranjpe, Vancouver (CA); Phillip Alan Hetherington, Port Moody (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 384 days.

(21) Appl. No.: 13/753,198

(22) Filed: Jan. 29, 2013

(65) Prior Publication Data

US 2014/0211951 A1 Jul. 31, 2014

(51) Int. Cl.

*H04R 5/00* (2006.01)
*H04R 23/00* (2006.01)
*H04B 15/00* (2006.01)
*H04R 5/04* (2006.01)
*H04S 7/00* (2006.01)
*H04R 3/00* (2006.01)
*H04R 3/02* (2006.01)

(52) U.S. Cl.

CPC . *H04R 5/04* (2013.01); *H04S 7/00* (2013.01); *H04R 3/005* (2013.01); *H04R 3/02* (2013.01)

(58) Field of Classification Search

None

See application file for complete search history.

(56) References Cited

U.S. PATENT DOCUMENTS 5,483,599 A 1/1996 Zagorski
7,117,145 B1 * 10/2006 Venkatesh ........... G10L 21/0208 704/200
8,175,871 B2 5/2012 Wang et al.

(Continued)

FOREIGN PATENT DOCUMENTS

EP 1 830 348 A1 9/2007
EP 1830348 A1 * 9/2007

(Continued)

OTHER PUBLICATIONS

Extended European Search Report dated Nov. 8, 2013 for European Application No. 13173052.5.

(Continued)

*Primary Examiner* — Andrew L Sniezek
(74) *Attorney, Agent, or Firm* — Brinks Gilson & Lione

(57) ABSTRACT

In a system and method for maintaining the spatial stability of a sound field a balance gain may be calculated for two or more microphone signals. The balance gain may be associated with a spatial image in the sound field. Signal values may be calculated for each of the microphone. The signal values may be signal estimates or signal gains calculated to improve a characteristic of the microphone signals. The differences between the signal values associated with each microphone signal may be limited although some difference between signal values may be allowable. One or more microphone signals are adjusted responsive to the two or more balance gains and the signal gains to maintain the spatial stability of the sound field. The adjustments of one or more microphone signals may include mixing of two or more microphone. The signal gains are applied to the two or more microphone signals.

22 Claims, 3 Drawing Sheets

(56) References Cited

U.S. PATENT DOCUMENTS

| | | | |
|---|---|---|---|
| 9,099,973 B2 | 8/2015 | Hetherington | |
| 9,106,196 B2 | 8/2015 | Hetherington | |
| 2007/0258579 A1 | 11/2007 | Hirai et al. | |
| 2008/0159559 A1 | 7/2008 | Akagi et al. | |
| 2008/0199019 A1 | 8/2008 | Fisher | |
| 2009/0012783 A1* | 1/2009 | Klein | 704/226 |
| 2010/0166206 A1* | 7/2010 | Macours | 381/71.6 |
| 2010/0280824 A1* | 11/2010 | Petit et al. | 704/214 |
| 2011/0038489 A1 | 2/2011 | Visser et al. | |
| 2011/0216917 A1 | 9/2011 | Ganeshkumar et al. | |
| 2011/0228951 A1 | 9/2011 | Sekiya et al. | |
| 2011/0313763 A1 | 12/2011 | Amada | |
| 2012/0123773 A1 | 5/2012 | Zeng et al. | |
| 2012/0207315 A1 | 8/2012 | Kimura et al. | |
| 2012/0237047 A1 | 9/2012 | Neal et al. | |
| 2012/0250927 A1 | 10/2012 | Ring | |
| 2012/0253798 A1 | 10/2012 | Walters et al. | |
| 2012/0275620 A1 | 11/2012 | Matsuo | |
| 2013/0156221 A1* | 6/2013 | Matsuo | 381/92 |
| 2013/0282369 A1 | 10/2013 | Visser et al. | |
| 2013/0282373 A1* | 10/2013 | Visser et al. | 704/233 |
| 2013/0301840 A1 | 11/2013 | Yemdji et al. | |
| 2014/0126745 A1 | 5/2014 | Dickins et al. | |
| 2014/0185818 A1 | 7/2014 | Endo et al. | |
| 2014/0334620 A1 | 11/2014 | Yemdji et al. | |

FOREIGN PATENT DOCUMENTS

| | | |
|---|---|---|
| EP | 2 426 950 A2 | 3/2012 |
| EP | 2 490 459 A1 | 8/2012 |
| WO | WO 0219768 | 3/2002 |
| WO | WO 2011/112382 A1 | 9/2011 |
| WO | WO 2011112382 A1 * | 9/2011 |

OTHER PUBLICATIONS

Extended European Search Report dated Nov. 18, 2013 for European Application No. 13173047.5.

Extended European Search Report dated Nov. 18, 2013 for European Application No. 13173053.3.

Notice of Allowance, dated Mar. 31, 2015, pp. 1-11, issued in U.S. Appl. No. 13/922,941, U.S. Patent and Trademark Office, Alexandria, Virginia.

Notice of Allowance, dated Apr. 9, 2015, pp. 1-11, issued in U.S. Appl. No. 13/922,970, U.S. Patent and Trademark Office, Alexandria, Virginia.

Non-Final Office Action, dated Jun. 9, 2015, pp. 1-15, U.S. Appl. No. 13/922,900, US Patent and Trademark Office, Alexandria, Virginia.

Extended European Search Report, dated Jun. 21, 2013, pp. 1-7, issued in European Patent Application No. 13153065.1, European Patent Office, Munich, Germany.

Canadian Office Action, dated Sep. 11, 2015, pp. 1-4, issued in Canadian Patent Application No. 2,835,991, Canadian Intellectual Property Office, Gatineau, Quebec, Canada.

Examination Report, dated Apr. 21, 2016, pp. 1-6, European Patent Application No. 13153065.1, European Patent Office, Munich, Germany.

Non-Final Office Action, dated Aug. 22, 2016, pp. 1-23, issued in U.S. Appl. No. 15/012,056, U.S. Patent and Trademark Office, Alexandria, VA.

* cited by examiner

SOUND FIELD SPATIAL STABILIZER

BACKGROUND

1. Technical Field

The present disclosure relates to the field of processing sound fields. In particular, to a system and method for maintaining the spatial stability of a sound field.

2. Related Art

Stereo and multichannel microphone configurations may be used for processing a sound field that is a spatial representation of an audible environment associated with the microphones. The audio received from the microphones may be used to reproduce the sound field using audio transducers.

Many computing devices may have multiple integrated microphones used for recording an audible environment associated with the computing device and communicating with other users. Computing devices typically use multiple microphones to improve noise performance with noise suppression processes. The noise suppression processes may result in the reduction or loss of spatial information. In many cases the noise suppression processing may result in a single, or mono, output signal that has no spatial information.

BRIEF DESCRIPTION OF DRAWINGS

The system may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

Other systems, methods, features and advantages will be, or will become, apparent to one with skill in the art upon examination of the following figures and detailed description. It is intended that all such additional systems, methods, features and advantages be included with this description, be within the scope of the invention, and be protected by the following claims.

DETAILED DESCRIPTION

In a system and method for maintaining the spatial stability of a sound field balance gains may be calculated for each of two or more microphone signals. The balance gains may be associated with a spatial image in the sound field. Signal values may be calculated for each of the received microphone signals. The signal values may be signal estimates or signal gains calculated to improve a characteristic of the microphone signals. The differences between the signal values associated with each microphone signal are limited to mitigate audible distortions in the spatial image. Some difference between signal values may be allowable in order to improve the audible characteristics of the received microphone signals. One or more microphone signals are adjusted responsive to the two or more balance gains and the signal gains to maintain the spatial stability of the sound field. The adjustments of one or more microphone signals may include mixing of two or more microphone signals. Further adjustments to the signal gains may be made responsive to the mixing process. The signal gains are applied respectively to each of the two or more microphone signals.

Figure 1:
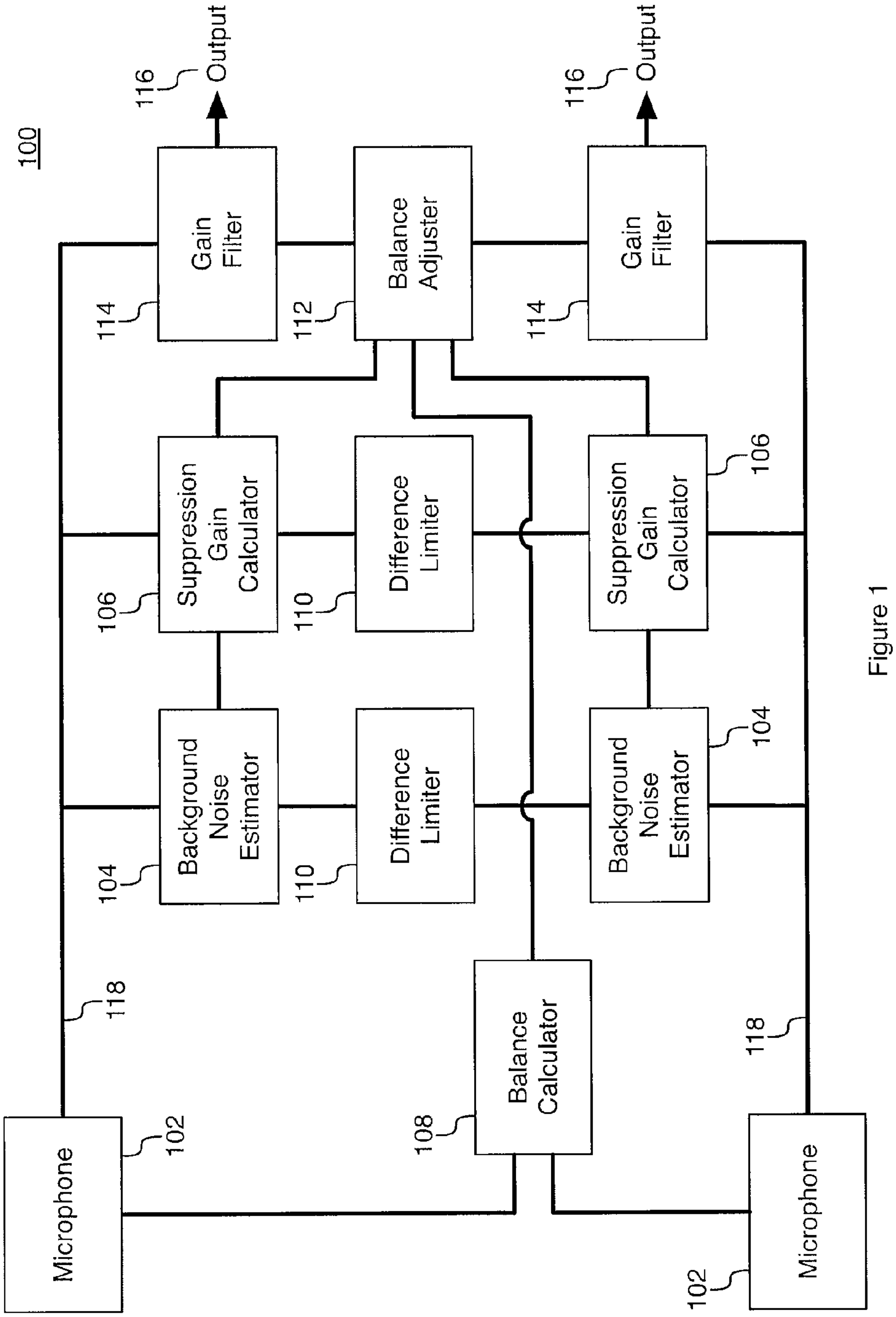
FIG. 1 is a schematic representation of a system for maintaining the spatial stability of a sound field.

FIG. 1 is a schematic representation of a system for maintaining the spatial stability of a sound field 100. Two or more microphones 102 receive the sound field. Stereo and multichannel microphone configurations may be utilized for processing the sound field that is a spatial representation of an audible environment associated with the microphones 102. Many audible environments associated with the microphones 102 may include undesirable content that may be mitigated by processing the received sound field. Microphones 102 that are arranged in a far field configuration typically receive more undesirable content, noise, than microphones 102 in a near field configuration. Far field configurations may include, for example, a hands free phone, a conference phone and microphones embedded into an automobile. Far field configurations are capable of receiving a sound field that represents the spatial environment associated with the microphones 102. Near field configurations typically place the microphone 102 in close proximity to a user. Undesirable content may be mitigated in both near and far field configurations by processing the received sound field.

Processing that may mitigate undesirable content received in the sound field may include echo cancellation and noise reduction processes. Echo cancellation, noise reduction and other audio processing processes may calculate one or more suppression, or signal, gains utilizing a suppression gain calculator 106. An echo cancellation process and a noise reduction process may each calculate one or more signal gains. Each respective signal gain may be applied individually or a composite signal gain may be applied to process the sound field using a gain filter 114. Echo cancellation processing mitigates echoes caused by signal feedback between two or more communication devices. Signal feedback occurs when an audio transducer on a first communication device reproduces the signal received from a second communication device and subsequently the microphones on the first communication device recapture the reproduced signal. The recaptured signal may be transmitted to the second communication device where the recaptured signal may be perceived as an echo of the previously transmitted signal. Echo cancellation processes may detect when the signal has been recaptured and attempt to suppress the recaptured signal. Many different echo cancellation processes may mitigate echoes by calculating one or more signal gains that, when applied to the signals received by the microphones 102, suppress the echoes. In one example implementation, the echo suppression gain may be calculated using coherence calculation between the predicted echo and the microphone disclosed in U.S. Pat. No. 8,036,879, which is incorporated herein by reference, except that in the event of any inconsistent disclosure or definition from the present specification, the disclosure or definition herein shall be deemed to prevail.

When the microphone 102 and an audio transducer are close in proximity, the echo cancellation process may determine that a large amount of suppression, or calculate large signal gains, as a result of the signal produced by the audio transducer dominating, or coupling with, the microphone 102.

When one of the microphones 102 and an audio transducer are in close proximity, the echo cancellation process may determine that a large amount of suppression may mitigate the signal produced by the audio transducer from dominating, or coupling with, the microphone 102. The echo cancellation process may calculate large signal gains to mitigate the coupling. The large signal gains may result in a gating effect where the communication device effectively supports only half duplex communication. Half duplex communication may occur when the communication channel allows for reliable communication from alternatively either the far side or near side but not both simultaneously. The large signal gains may suppress the coupling but may also suppress all content, including desired voice content resulting in half duplex communication.

Background noise is another type of undesirable signal content that may be mitigated by processing the received sound field. Many different types of noise reduction processing techniques may mitigate background noise. An exemplary noise reduction method is a recursive Wiener filter. The Wiener suppression gain $G_{i,k}$, or signal gain, is defined as $$G_{i,k} = \frac{S\hat{N}R_{priori_{i,k}}}{S\hat{N}R_{priori_{i,k}} + 1}. \tag{1}$$

Where $S\hat{N}R_{priori_{i,k}}$ is the a priori SNR estimate and is calculated recursively by $$S\hat{N}R_{priori_{i,k}} = G_{i-1,k} S\hat{N}R_{post_{i,k}} - 1. \tag{2}$$

$S\hat{N}R_{post_{i,k}}$ is the a posteriori SNR estimate given by $$S\hat{N}R_{post_{i,k}} = \frac{|Y_{i,k}|^2}{|\hat{N}_{i,k}|^2}. \tag{3}$$

Here $|\hat{N}_{i,k}|$ is a background noise estimate. In one example implementation, the background noise estimate, or signal values, may be calculated using the background noise estimation techniques disclosed in U.S. Pat. No. 7,844,453, which is incorporated herein by reference, except that in the event of any inconsistent disclosure or definition from the present specification, the disclosure or definition herein shall be deemed to prevail. In other implementations, alternative background noise estimation techniques may be used, such as, for example, a noise power estimation technique based on minimum statistics.

Additional noise reduction processing may mitigate specific types of undesirable noise characteristics including, for example, wind noise, transient noise, rain noise and engine noise. Mitigation of some specific types of undesirable noise may be referred to as signature noise reduction processes. Signature noise reduction processes detect signature noise and generate signal gains that may be used to suppress a detected signature noise. In one implementation, wind noise suppression gains (a.k.a. signal gains) may be calculated using the system for suppressing wind noise disclosed in U.S. Pat. No. 7,885,420, which is incorporated herein by reference, except that in the event of any inconsistent disclosure or definition from the present specification, the disclosure or definition herein shall be deemed to prevail.

The sound field received by the two or more microphones 102 may contain a spatial representation, or a spatial image, of an audible environment. Balance gains may be calculated responsive to the spatial image in the sound field. The balance gains may be calculated with a balance calculator 108. The balance calculator 108 may calculate the balance gains by measuring an energy level in a signal from each microphone 102. The energy level differences may represent the approximate balance of the spatial image. One or more energy levels may be calculated for each microphone 102 generating one or more balance gains. A single balance gain may be utilized in a two microphone configuration where the single balance gain may be the ratio of energy levels between the two microphone signals 118.

A subband filter may process the received microphone signal 118 to extract frequency information. The subband filter may be accomplished by various methods, such as a Fast Fourier Transform (FFT), critical filter bank, octave filter band, or one-third octave filter bank. Alternatively, the subband analysis may include a time-based filter bank. The time-based filter bank may be composed of a bank of overlapping bandpass filters, where the center frequencies have non-linear spacing such as octave, $3^{rd}$ octave, bark, mel, or other spacing techniques. The one or more energy levels may be calculated for each frequency bin or band of the subband filter. The resulting balance gains may be filtered, or smoothed, over time and/or frequency. The balance calculator 108 may update the balance gains responsive to desired signal content. For example, the balance gains may be updated when, for example, the energy level exceeds a threshold, the signal to noise ratio (SNR) exceeds a threshold, a voice activity detector detects voice content or any combination thereof.

The background noise estimator 104 may calculate a background noise estimate, or signal value, for each microphone signal 118. When the microphones 102 are spaced apart, the background noise estimator 104 may calculate different signal values responsive to the received sound value. Some difference in the calculated background noise estimate may be acceptable but relatively large differences may indicate a potential corruption or misrepresentation of one or more of the signals. For example, a user may be blocking one microphone 102 with a finger resulting in a relatively large difference in the background noise estimate. The background noise estimate may be utilized for many subsequent calculations including signal-to-noise ratios, echo cancellers and noise reduction calculators. When the subsequent calculations utilize background noise estimates that contain relatively large differences the subsequent calculations may yield corrupted or misrepresentative results. For example, large differences in suppression gains between microphones 102 may result in audible distortions in the spatial image of the sound field.

A difference limiter 110 may limit the difference in the background noise estimates, or signal values, and/or the adaption rates utilized in the background noise estimator 104. The different limiter 110 may mitigate audio distortions in the spatial image when reproduced in the output sound field. For example, a difference between corresponding signal values in the calculated background noise estimates may be acceptable when the difference is 2 dB (decibels) to 4 dB but noticeable when the difference exceeds 6 dB. The difference limiter 110 may, for example, limit the difference between signal values to 6 dB or may allow a difference proportional to the signal value when the difference is greater than 6 dB. The difference limiter 110 may utilize a coherence and/or correlation calculation between microphones to limit a difference between the signal values. Two signals that are correlated may indicate that the difference between signal values should be limited. The difference limiter 110 may smooth, or filter, the amount of limiting over time and frequency.

The difference limiter 110 may be applied to other signal values including suppression gains, or signal gains, calculated using the suppression gain calculator 106. The suppression gain calculator 106 may calculate signal gains for the echo cancellation and noise reduction processes described above. Signature noise reduction processes may calculate signal gains that have large differences between microphone signals 118. For example, in the case of wind noise reduction, a first microphone 102 may receive significant wind noise and the second microphone 102 may receive negligible wind noise. An example portable computing device may have two microphones 102 placed several inches apart where the first microphone 102 may be located on the bottom surface and the second microphone 102 may be located on the top surface. The first microphone 102 and the second microphone 102 may be relatively close in position although they may not be close enough to process phase differences to utilize, for example, a beam forming combining process. Even though the microphones 102 are relatively close in position on the example portable computing device, one microphone 102 may receive significant wind noise. The suppression gain calculator 106 may calculate signal gains that may contain relatively large differences. The difference limiter 110 may allow some of the wind noise to be suppressed while mitigating audio distortions in the spatial image of the sound field. For example, a difference between corresponding signal gains generated by the suppression gain calculators 106 may be acceptable when the difference is 2 dB to 4 dB but noticeable when the difference exceeds 6 dB. The difference limiter 110 may limit the difference between signal values to 6 dB or may allow a difference proportional to the signal value when the difference is greater than 6 dB. The difference limiter 110 may smooth, or filter, the amount of limiting over time and frequency.

The difference limiter 110 may mitigate some distortion in the spatial image when reproduced in the output sound field although it may be possible that the combination of one or more of the signal values calculated utilizing the background noise estimator 104 and suppression gain calculator 106 may still distort the spatial image. Additionally, in some cases the suppression gain calculator 106 may not utilize the difference limiter 110. For example, when the microphone 102 and audio transducer are coupled as described above resulting in a gating effect, the difference limiter 110 may not be utilized because the audible artifacts associated with the coupling are perceptibly more distracting than distorting the spatial image. In this case, the echo cancellation process may be allowed to gate the microphone signal 118 without applying the difference limiter 110.

A balance adjuster 112 may maintain the spatial stability when reproduced in the output sound field. The balance adjuster 112 may mitigate distortions in the spatial image that may not be mitigated with the difference limiter 110. Additionally, the balance adjuster 112 may mitigate audio distortions in the spatial image where the difference limiter 110 may not be applied. The balance adjuster 112 may adjust the signal gains using the balance gains calculated with the balance calculator 108 and the signal gains. The balance gains may represent the approximate balance of the spatial image. The balance adjuster 112 may adjust the signal gains responsive to the balance gains. Additionally, the balance adjuster 112 may mix, or borrow, between two or more microphone signals 118 to maintain the spatial stability and to more closely track the balance gains. In one example, the echo-gating triggered half-duplex use case described above may have a first microphone signal 118 that may be gated. The balance adjuster 112 may mitigate audio distortions in the spatial image by borrowing audio from a second microphone signal 118 responsive to the balance gain. The second microphone signal 118 may have associated signal gains that may be adjusted responsive to the balance gain. The second microphone signal 118 that is borrowed may be mixed into the first microphone signal 118. The balance adjuster 112 may adjust the signal gains and the borrowing of microphone signals 118 may be filtered, or smoothed, over time and frequency. The adjustments may be performed on a frequency bin and/or band using the subband filter described above.

A gain filter 114 applies the signal gains to the two or more microphone signals 118. The signal gains may be a combination of signal gains associated with one or more suppression gain calculators 106. The gain filter 114 may utilize the subband filter described above.

Figure 2:
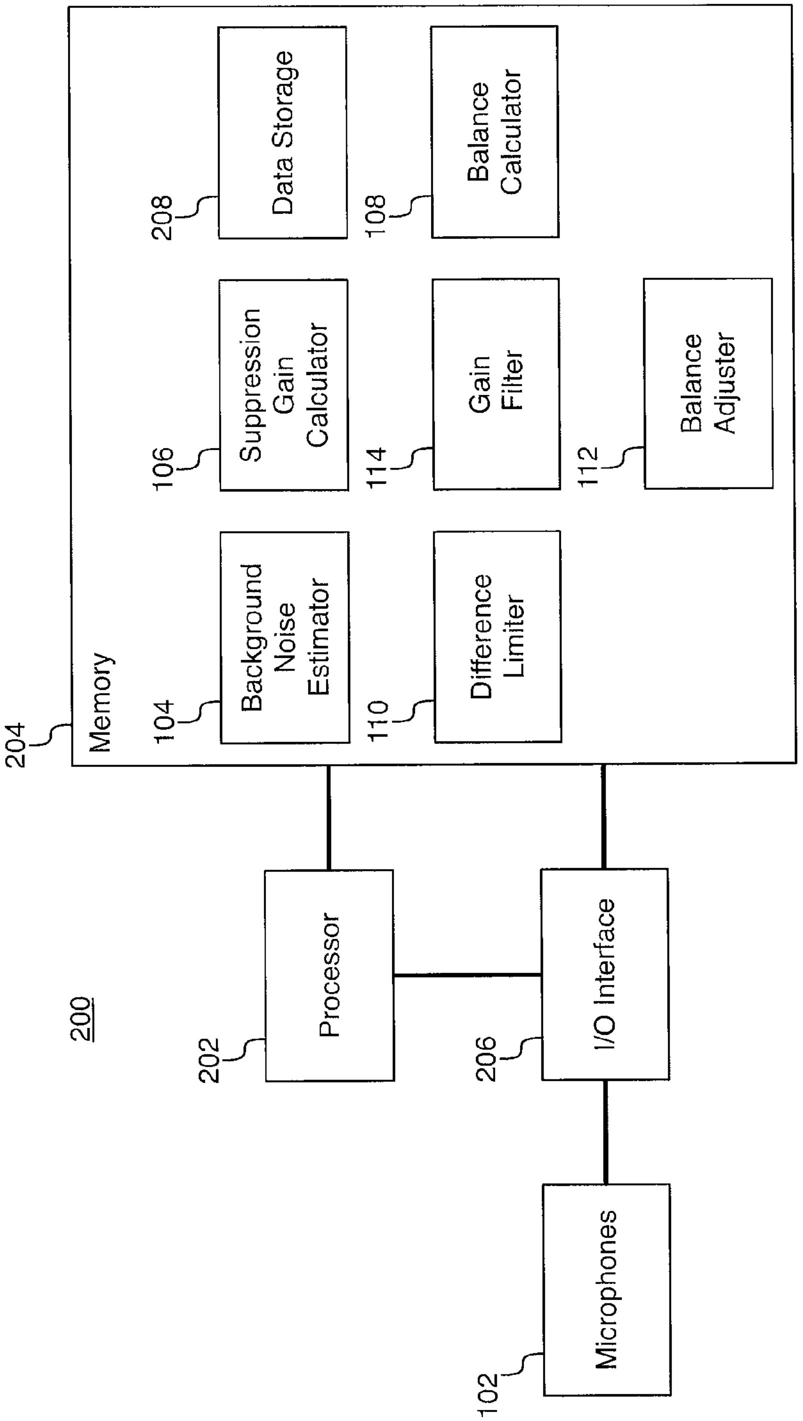
FIG. 2 is a further schematic representation of a system for maintaining the spatial stability of the sound field.

FIG. 2 is a further schematic representation of a system for maintaining the spatial stability when reproduced in the output sound field. The system 200 comprises a processor 202, memory 204 (the contents of which are accessible by the processor 202), two or more microphones 102 and an I/O interface 206. The two or more microphones 102 may be either internal or external to the system 200 or a combination of internal and external. The memory 204 may store instructions which when executed using the processor 202 may cause the system 200 to render the functionality associated with the background noise estimator module 104, the suppression gain calculator module 106, the balance calculator module 108, the difference limiter module 110, the balance adjuster module 112 and the gain filter module 114 described herein. In addition, data structures, temporary variables and other information may store data in data storage 208.

The processor 202 may comprise a single processor or multiple processors that may be disposed on a single chip, on multiple devices or distributed over more that one system. The processor 202 may be hardware that executes computer executable instructions or computer code embodied in the memory 204 or in other memory to perform one or more features of the system. The processor 202 may include a general purpose processor, a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 204 may comprise a device for storing and retrieving data, processor executable instructions, or any combination thereof. The memory 204 may include non-volatile and/or volatile memory, such as a random access memory (RAM), a read-only memory (ROM), an erasable programmable read-only memory (EPROM), or a flash memory. The memory 204 may comprise a single device or multiple devices that may be disposed on one or more dedicated memory devices or on a processor or other similar device. Alternatively or in addition, the memory 204 may include an optical, magnetic (hard-drive) or any other form of data storage device.

The memory 204 may store computer code, such as the background noise estimator module 104, the suppression gain calculator module 106, the balance calculator module 108, the difference limiter module 110, the balance adjuster module 112 and the gain filter module 114 described herein. The computer code may include instructions executable with the processor 202. The computer code may be written in any computer language, such as C, C++, assembly language, channel program code, and/or any combination of computer languages. The memory 204 may store information in data structures in the data storage 208.

The I/O interface 206 may be used to connect devices such as, for example, microphones 102, and to other components internal or external to the system 200.

Figure 3:
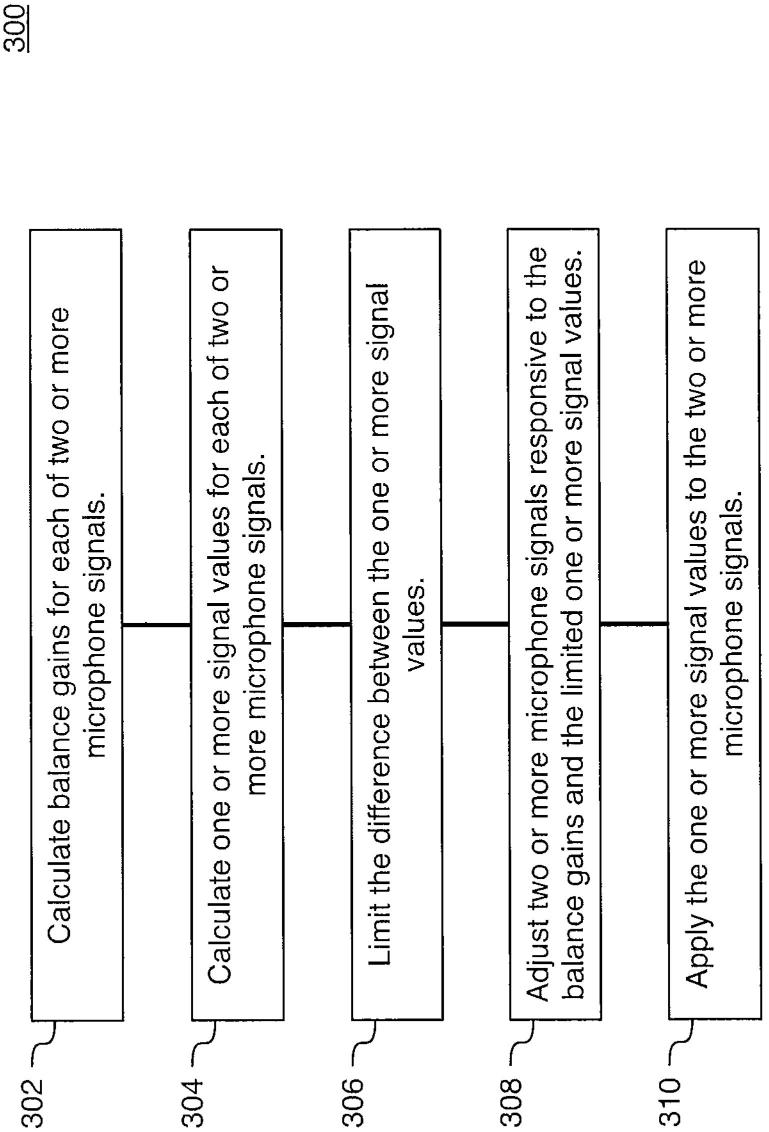
FIG. 3 is flow diagram representing a method for maintaining the spatial stability of the sound field.

FIG. 3 is flow diagram representing a method for maintaining a spatial stability of a sound field. The method 300 may be, for example, implemented using either of the systems 100 and 200 described herein with reference to FIGS. 1 and 2. The method 300 may include the following acts. Calculating a balance gain for each of two or more microphone signals 302. The balance gain may be associated with a spatial image in the sound field. Calculating one or more signal values for each of two or more microphone signals 304. The signal values may be the background noise estimate or signal gains associated with echo cancellation and noise reduction processes. Limiting the difference between the two or more signal values 306. The difference between signal values may be limited to mitigate distortions in the spatial image of the sound field. Adjusting one or more microphone signals responsive to the two or more balance gains and the signal gains 308. One or more microphone signals may be mixed, or borrowed, with another microphone signal responsive to the balance gains and signal gains. Applying the signal gains to the two or more microphone signals 310.

All of the disclosure, regardless of the particular implementation described, is exemplary in nature, rather than limiting. The systems 100 and 200 may include more, fewer, or different components than illustrated in FIGS. 1 and 2. Furthermore, each one of the components of systems 100 and 200 may include more, fewer, or different elements than is illustrated in FIGS. 1 and 2. Flags, data, databases, tables, entities, and other data structures may be separately stored and managed, may be incorporated into a single memory or database, may be distributed, or may be logically and physically organized in many different ways. The components may operate independently or be part of a same program or hardware. The components may be resident on separate hardware, such as separate removable circuit boards, or share common hardware, such as a same memory and processor for implementing instructions from the memory. Programs may be parts of a single program, separate programs, or distributed across several memories and processors.

The functions, acts or tasks illustrated in the figures or described may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, distributed processing, and/or any other type of processing. In one embodiment, the instructions are stored on a removable media device for reading by local or remote systems. In other embodiments, the logic or instructions are stored in a remote location for transfer through a computer network or over telephone lines. In yet other embodiments, the logic or instructions may be stored within a given computer such as, for example, a CPU.

While various embodiments of the system and method for maintaining the spatial stability of a sound field have been described, it will be apparent to those of ordinary skill in the art that many more embodiments and implementations are possible within the scope of the present invention. Accordingly, the invention is not to be restricted except in light of the attached claims and their equivalents.

The invention claimed is:

1. A computer implemented method for maintaining spatial stability of a sound field comprising:

calculating one or more balance gains for two or more microphone signals, where each of the two or more microphone signals is from a corresponding one of two or more microphones, the one or more balance gains represent a detected balance of a spatial image of the sound field received by the microphones;

calculating one or more signal values for each of the two or more microphone signals;

limiting differences between corresponding one or more signal values for each of the two or more microphone signals; and maintaining the detected balance of the sound field in two or more output signals generated by gain adjusting the two or more microphone signals taking into account the one or more balance gains and the limited one or more signal values for each of the two or more microphone signals.

2. The computer implemented method of claim 1, where the one or more signal values comprises one or more of an estimated background noise and a calculated suppression gain.

3. The computer implemented method of claim 2 where the suppression gain comprises one or more of a noise reduction calculation and an echo cancellation calculation.

4. The computer implemented method of claim 2, where calculating each of the one or more signal values further comprises calculating one or more of a background noise estimate and a background noise adaptation rate.

5. The computer implemented method of claim 2, where limiting the difference between each of the one or more signal values that comprise suppression gains further comprises limiting the suppression gains when a threshold is exceeded.

6. The computer implemented method of claim 3, where the noise reduction calculation comprises any one or more of a wind noise reduction calculation, transients noise reduction calculation, road noise reduction calculation, repetitive noise reduction calculation and engine noise reduction calculation.

7. The computer implemented method of claim 1, where calculating the one or more balance gains for the two or more microphone signals further comprises an energy measurement.

8. The computer implemented method of claim 1, where gain adjusting the two or more microphone signals further comprises mixing a first microphone signal with a second microphone signal.

9. The computer implemented method of claim 1, further comprising generating a set of sub-bands for each of the two or more microphone signals using a subband filter or a Fast Fourier Transform.

10. The computer implemented method of claim 1, further comprising generating a set of sub-bands for each of the two or more microphone signals according to a critical, octave, mel, or bark band spacing technique.

11. A system for maintaining spatial stability of a sound field comprising:

a balance calculator configured to calculate one or more balance gains for each of two or more microphone signals, the one or more balance gains representing a detected balance of a spatial image of the sound field received by the microphones;

two or more signal value generators, each one associated with a corresponding one of the two or more microphone signals, configured to calculate one or more signal values;

one or more difference limiters configured to limit differences between corresponding one or more signal values for each of the two or more microphone signals;

a balance adjuster configured to calculate adjusted one or more balance gains responsive to the calculated one or more balance gains and the limited one or more signal values for each of the two or more microphone signals, the adjusted one or more balance gains calculated to maintain the detected balance of the sound field in two or more output signals; and two or more gain filters, each one associated with one of the two or more microphone signals, configured to generate the two or more output signals as gain adjustments of the two or more microphone signals, the gain adjustments responsive to the adjusted one or more balance gains.

12. The system for maintaining spatial stability of a sound field of claim 11, where each of the two or more signal value generators comprises one or more of a background noise estimator and a suppression gain calculator.

13. The system for maintaining spatial stability of a sound field of claim 12 where the suppression gain calculator comprises one or more of a noise reduction calculator and an echo cancellation calculator.

14. The system for maintaining spatial stability of a sound field of claim 12, where the two or more signal value generators configured to calculate the one or more signal values is further configured to calculate at least one of a background noise estimate or a background noise adaptation rate.

15. The system for maintaining spatial stability of a sound field of claim 12, where the one or more signal values comprise suppression gains generated by the suppression gain calculator, and each of the one or more difference limiters limits the suppression gains when a threshold is exceeded.

16. The system for maintaining spatial stability of a sound field of claim 13, where the noise reduction calculator comprises any one or more of a wind noise reduction calculator, transients noise reduction calculator, road noise reduction calculator, repetitive noise reduction calculator and engine noise reduction calculator.

17. The system for maintaining spatial stability of a sound field of claim 11, where the balance calculator further to take an energy measurement for each of two or more microphone signals.

18. The system for maintaining spatial stability of a sound field of claim 11, where the balance adjuster is further configured to selectively update the adjusted one or more balance gains responsive to one or more of the signal values exceeding a first threshold and a signal-to-noise ratio of any of the two or more microphone signals exceeding a second threshold.

19. The system for maintaining spatial stability of a sound field of claim 11, where the two or more gain filters are further configured to gain adjust one or more microphone signals by a mixing of a first microphone signal with a second microphone signal.

20. The system for maintaining spatial stability of a sound field of claim 11, further comprising a subband filter or a Fast Fourier Transform configured to generate a set of sub-bands of the microphone signals.

21. The system for maintaining spatial stability of a sound field of claim 11, further comprising a critical, octave, mel, or bark band spacing mechanism configured to generate a set of sub-bands of the microphone signals.

22. A computer implemented method for maintaining spatial stability of a sound field comprising:

calculating one or more balance gains for two or more microphone signals, where each of the two or more microphone signals is from a corresponding one of two or more microphones, the one or more balance gains represent a balance of a spatial image of the sound field received by the microphones;

calculating one or more signal values for each of the two or more microphone signals, where calculating the one or more balance gains for the two or more microphone signals further comprises selectively updating the one or more balance gains responsive to one or more of the signal values exceeding a first threshold and a signal-to-noise ratio of any of the two or more microphone signals exceeding a second threshold;

limiting differences between corresponding one or more signal values for each of the two or more microphone signals; and maintaining the spatial stability of the sound field by gain adjusting the two or more microphone signals responsive to the one or more balance gains and the limited one or more signal values for each of the two or more microphone signals.

* * * * *